US009210786B2

(12) United States Patent
Bardaine et al.

(10) Patent No.: US 9,210,786 B2
(45) Date of Patent: Dec. 8, 2015

(54) INDUCTIVE PLASMA TORCH

(75) Inventors: Anthony Bardaine, Grenoble (FR); Serge Baret, Voiron (FR); Jean-François LaFleur, Chassieu (FR); Guillaume LeComte, Grenoble (FR); Henri Montagnat Rentier, Miribel les Eschelles (FR); Loïc Reboud, Saint Pierre de Bressieux (FR)

(73) Assignee: EFD INDUCTION SA, Seyssinet Pariset (FR)

( * ) Notice: Subject to any disclaimer, the term of this patent is extended or adjusted under 35 U.S.C. 154(b) by 76 days.

(21) Appl. No.: 13/984,438

(22) PCT Filed: Feb. 10, 2012

(86) PCT No.: PCT/FR2012/050295
§ 371 (c)(1), (2), (4) Date: Feb. 3, 2014

(87) PCT Pub. No.: WO2012/107699
PCT Pub. Date: Aug. 16, 2012

(65) Prior Publication Data

US 2014/0319106 A1 Oct. 30, 2014

(30) Foreign Application Priority Data

Feb. 11, 2011 (FR) ..................................... 11 51130

(51) Int. Cl.

| | |
|---|---|
| ***B23K 10/00*** | (2006.01) |
| ***H05H 1/30*** | (2006.01) |
| ***H05H 1/28*** | (2006.01) |

(52) U.S. Cl.
CPC . *H05H 1/30* (2013.01); *H05H 1/28* (2013.01); *Y10T 29/4902* (2015.01)

(58) Field of Classification Search
CPC ........ Y10T 29/4902; H05H 1/30; H05H 1/28; H05H 1/34
USPC ............ 219/121.52, 121.48, 121.36, 121.75, 219/121.51; 315/111.21, 111.51
See application file for complete search history.

(56) References Cited

U.S. PATENT DOCUMENTS

| | | | | |
|---|---|---|---|---|
| 4,431,901 | A | 2/1984 | Hull | |
| 4,766,287 | A * | 8/1988 | Morrisroe et al. ....... | 219/121.52 |

(Continued)

FOREIGN PATENT DOCUMENTS

| | | |
|---|---|---|
| DE | 1271852 | 7/1968 |
| DE | 29823703 | 12/1999 |
| DE | 102004054826 A1 | 5/2006 |
| WO | 99/19526 | 4/1999 |

OTHER PUBLICATIONS

International Searching Authority, International Search Report, dated Jun. 27, 2012 for PCT/FR2012/050295.

(Continued)

*Primary Examiner* — Mark Paschall
(74) *Attorney, Agent, or Firm* — Kevin R. Erdman; Brannon Sowers & Cracraft PC

(57) ABSTRACT

The invention relates to an inductive plasma torch comprising: a cylindrical metal containment cage (1); a metal element solidly connected to the containment cage (1), extending radially from the periphery of one end thereof; and an inductor (5) surrounding the containment cage (1). The aforementioned containment cage (1) and element are divided along axial planes into regularly distributed sectors, and the sectors are rigidly connected to one another alternately by: a portion of the containment cage (1) on the side opposite the element, or by a portion of the element on the side opposite the containment cage (1).

20 Claims, 4 Drawing Sheets

(56) References Cited

U.S. PATENT DOCUMENTS

| | | | | | |
|---|---|---|---|---|---|
| 5,233,155 | A | * | 8/1993 | Frind | 219/121.52 |
| 5,234,529 | A | | 8/1993 | Johnson | |
| 5,877,471 | A | * | 3/1999 | Huhn et al. | 219/121.49 |
| 5,925,266 | A | * | 7/1999 | Gagne | 219/121.48 |
| 6,130,397 | A | | 10/2000 | Arai | |
| 7,232,767 | B2 | | 6/2007 | George et al. | |

OTHER PUBLICATIONS

International Searching Authority, English Translation of International Preliminary Report on Patentability, dated Aug. 22, 2013 for PCT/FR2012/050295.

* cited by examiner

PRIOR ART

INDUCTIVE PLASMA TORCH

CROSS-REFERENCE TO RELATED APPLICATIONS

The present application is a National Stage of PCT International Application Serial Number PCT/FR2012/050295, filed Feb. 10, 2012, which claims priority under 35 U.S.C. §119 of French Patent Application Serial Number 11/51130, filed Feb. 11, 2011, the disclosures of which are incorporated by reference herein.

BACKGROUND

The present invention relates to inductive plasma torches.

DISCUSSION OF THE RELATED ART

In an inductive plasma torch, a plasma gas is injected into a confinement cage where it is submitted to an A.C. magnetic field which ionizes the gas to form a plasma.

The confinement cage of an inductive plasma torch should have several characteristics:

- tightness to gases,
- letting through the magnetic field, and
- resisting very high temperatures since the temperature at the heart of the plasma may reach values on the order of 7,000° C.

Cold confinement cages formed of sectorized conductive cylinders cooled by the circulation of a liquid are currently used.

FIG. 1 is a perspective view cut along a vertical plane of an inductive plasma torch with a cold confinement cage of the type described in U.S. Pat. No. 5,877,471.

Confinement cage 1 is formed of multiple separated parallel metal tubes 2, arranged to define together a hollow cylinder. Tubes 2 extend between a bottom part 3 on the upper side and a cap 4 on the lower side. The upper portion of confinement cage 1 is surrounded with an inductive winding 5. A gas injector 7 penetrates into confinement cage 1 through cap 4 all the way to inductive winding 5. Bottom part 3 is pierced with a flame outlet opening. The assembly is rigidified by bars 8 connecting bottom part 3 and cap 4 outside of confinement cage 1.

Confinement cage 1 is made tight by a sheath made of an insulating material, not shown in FIG. 1, surrounding the assembly of tubes 2.

Inductive winding 5 is hollow, and a cooling liquid flows inside of it. Tubes 2 also conduct a cooling liquid injected and discharged from cap 4.

When an A.C. current flows through inductor 5, this creates an axial A.C. magnetic field intended to ionize the plasma gas injected into confinement cage 1 to form a plasma. The magnetic field is capable of creating eddy currents in the various conductive materials forming the torch. Such currents have two adverse effects. They heat up the conductors by Joule effect and induce an attenuation of the axial magnetic field. The fact for the confinement cage to be made of separate parallel tubes is equivalent to a sectorization of this cage, which results in that the magnetic field can cross it with some attenuation while eddy currents cannot flow around this cage. A problem is however posed regarding the bottom part and the cap, and especially the bottom part arranged around a region taken to a very high temperature in operation by the torch flame. A problem of interference caused by the A.C. magnetic field radiated outside of the torch is also posed.

SUMMARY

An object of an embodiment of the present invention is to provide an inductive plasma torch having all its elements properly cooled down.

Another object of an embodiment of the present invention is to provide an inductive plasma torch having a simple manufacturing and assembly.

Another object of an embodiment of the present invention is to provide an inductive plasma source.

Another object of an embodiment of the present invention is to provide an inductive plasma source having an improved electric efficiency.

Another object of an embodiment of the present invention is to provide an inductive plasma source capable of operating in the presence of a high-temperature radiating medium in front of this torch.

Another object of an embodiment of the present invention is to provide an inductive plasma source provided with a protection against parasitic radiations from the magnetic field.

Another object of an embodiment of the present invention is to provide an inductive plasma torch of small volume.

Thus, an embodiment of the present invention provides an inductive plasma torch comprising a cylindrical metal confinement cage, a metal element rigidly attached to the confinement cage, radially extending, outwards, from the periphery of an end thereof, and an inductor surrounding the confinement cage, wherein the confinement cage and said element are divided along axial planes into regularly distributed sectors, and wherein the sectors are alternately attached to a portion of the confinement cage on the side opposite to the element and to a portion of said element on the side opposite to the confinement cage.

According to an embodiment of the present invention, said element is a laterally—extending bottom part.

According to an embodiment of the present invention, said element comprises an external cylindrical cage, concentric to the confinement cage and attached thereto by the bottom part.

According to an embodiment of the present invention, the confinement cage and said element are crossed by ducts.

According to an embodiment of the present invention, the confinement cage and said element are made of copper.

An embodiment of the present invention provides a method for manufacturing an inductive plasma torch, wherein a block of metallic material, comprising a first cylinder and an element rigidly attached to the first cylinder by one end thereof radially extending outwards from the periphery of an end of the first cylinder, is formed, and wherein axial slots are formed to define sectors in said block, each slot crossing the element or the first cylinder and the cutting being alternately interrupted a short distance from an edge of the element opposite to the first cylinder and at a short distance from an edge of the first cylinder opposite to the element.

According to an embodiment of the present invention, said element is a laterally—extending bottom part.

According to an embodiment of the present invention, said element is a second cylinder concentric to and rigidly attached to the first cylinder by a bottom part.

According to an embodiment of the present invention, said block is formed by milling.

According to an embodiment of the present invention, the conductive material is copper.

According to an embodiment of the present invention, ducts are formed across the thickness of the cylinder and of said element.

BRIEF DESCRIPTION OF THE DRAWINGS

The foregoing and other objects, features, and advantages will be discussed in detail in the following non-limiting description of specific embodiments in connection with the accompanying drawings, among which.

The same reference numerals designate the same elements in the various drawings.

DETAILED DESCRIPTION

Figure 2A:
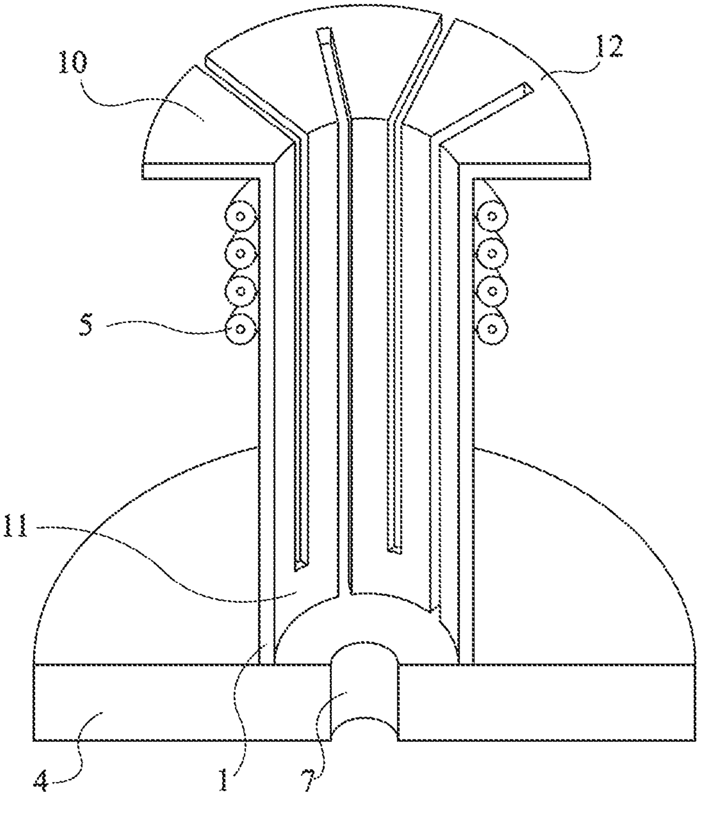
FIG. 2A is a perspective view cut along a vertical plane of an inductive plasma torch according to an embodiment of the present invention.

FIG. 2A illustrates an embodiment of an inductive plasma torch with cold walls. The plasma torch comprises a cylinder-shaped metal confinement cage 1. The confinement cage is rigidly attached to a cooled metal bottom part 10 laterally extending outwards from the periphery of the upper end of confinement cage 1 (on the flame outlet side), such a bottom part being used as a thermal shield relative to a hot medium, for example, a melt of a molten material, receiving the torch flame. A cap 4 is assembled on the lower side. Confinement cage 1 and bottom part 10 form a single element which is divided into sectors by axial slots. The slots are interrupted so that the sectors are alternately attached by junction regions 11 extending between sectorized portions next to confinement cage 1 on the side opposite to bottom part 10 and by junction regions 12 extending between sectorized portions next to bottom part 10 on the side opposite to confinement cage 1. An inductive winding 5 arranged on the side of bottom part 10 surrounds confinement cage 1. A gas injector 7, not integrally shown, penetrates into confinement cage 1 through cap 4 all the way to inductive winding 5.

Figure 2B:
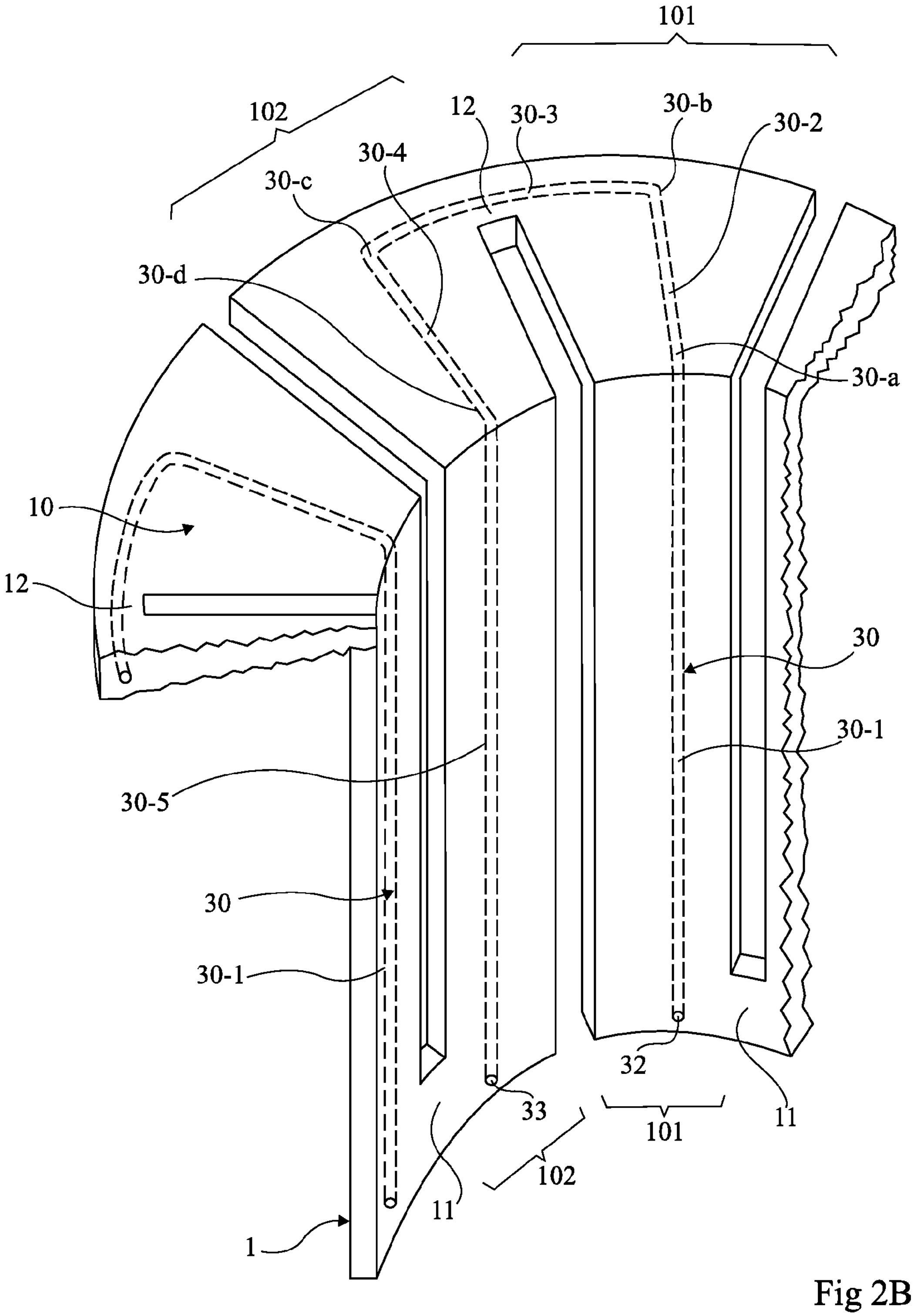
FIG. 2B is a perspective view illustrating three adjacent sectors of the confinement cage and of the bottom part of the plasma torch of FIG. 2A.

FIG. 2B is a perspective view illustrating in enlarged fashion three adjacent sectors of the confinement cage and of the bottom part of the inductive plasma torch of FIG. 2A. FIG. 2B especially illustrates internal ducts enabling a cooling fluid to flow within the thickness of the metal forming confinement cage 1 and bottom part 10.

A pair of adjacent sectors 101 and 102 attached to each other by a junction 12 located at the end of bottom part 10 opposite to confinement cage 1 and attached to the neighboring sectors by junctions 11 located at the lower end of confinement cage 1 is considered. A duct 30 comprises five duct sections 30-1 to 30-5 formed inside of the walls of confinement cage 1 and of bottom part 10. Each section communicates with the next section. Section 30-1 extends vertically from an opening 32 in the lower portion of confinement cage 1 of sector 101 all the way to a region 30-*a* located in bottom part 10 of sector 101. Section 30-2 extends radially in bottom part 10 of sector 101 from region 30-*a* to a region 30-*b* located at the end of bottom part 10 of sector 101 opposite to confinement cage 1. Section 30-3 extends in bottom part 10 from region 30-*b* to a region 30-*c* located in bottom part 10 of section 102 and symmetrical to region 30-*b* of sector 101. Section 30-4 extends radially in bottom part 10 of sector 102 from region 30-*c* to a region 30-*d* located at the level of confinement cage 1 of sector 102. Section 30-5 extends vertically in confinement cage 1 of sector 102 from sector 30-*d* to an opening 33 in the lower portion of confinement cage 1 of sector 102.

Figure 3A:
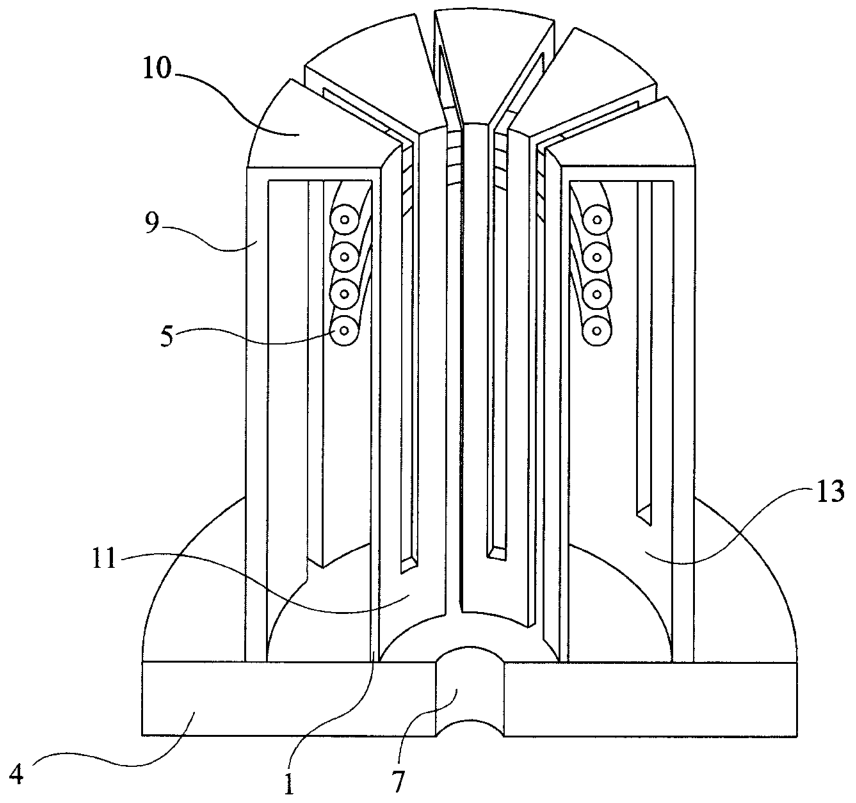
FIG. 3A is a perspective view cut along a vertical plane of an inductive plasma torch according to another embodiment of the present invention.

FIG. 3A illustrates another embodiment of an inductive plasma torch. The inductive plasma torch comprises a cylinder-shaped confinement cage 1 and an external cage 9 having the shape of a coaxial cylinder. Confinement cage 1 and external cage 9 are connected on the upper side (on the flame outlet side) by a bottom part 10. A cap 4 is assembled on the lower side. Confinement cage 1, external cage 9, and bottom part 10 form a single metallic element, for example, made of copper, which is divided into sectors by axial slots. The slots are interrupted so that the sectors are attached, on the side opposite to the bottom, alternately by junction regions 11 extending between sectorized portions next to confinement cage 1 and by junction regions 13 extending between sectorized portions next to external cage 9. An inductive winding 5 arranged on the side of bottom part 10 surrounds confinement cage 1. A gas injector 7, not integrally shown, penetrates into confinement cage 1 through cap 4 all the way to inductive winding 5. The external cage aims at limiting electromagnetic radiations emitted towards the outside.

Figure 3B:
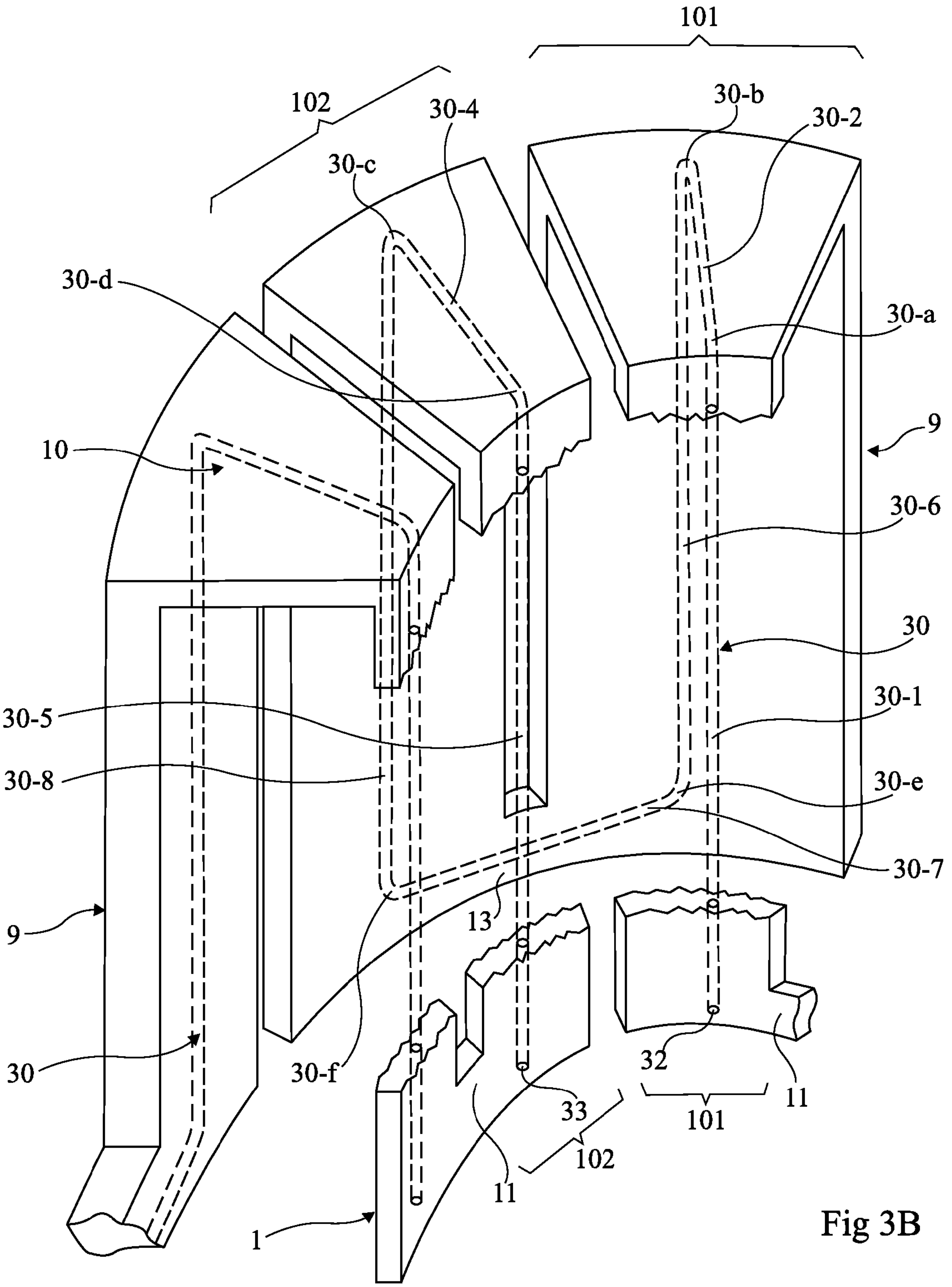
FIG. 3B is a perspective view illustrating three adjacent sectors of the confinement cage, of the external cage, and of the bottom part of the plasma torch of FIG. 3A.

FIG. 3B is a perspective view illustrating in enlarged fashion three adjacent sectors of the confinement cage, of the external cage, and of the bottom part of the inductive plasma torch of FIG. 3A. The central portion of confinement cage 1 is stripped open for clarity. FIG. 3B especially illustrates internal ducts enabling a cooling fluid to flow within the thickness of the metal forming confinement cage 1, external cage 9, and bottom part 10.

A pair of adjacent sectors 101 and 102 attached to each other by a junction 13 located at the lower end of external cage 9 and attached to the neighboring sectors by junctions 11 located at the lower end of confinement cage 1 is considered. A duct 30 comprises seven duct sections 30-1, 30-2, 30-6 to 30-8, 30-4 and 30-5 formed inside of the walls of confinement cage 1, of external cage 9, and of bottom part 10. Each section communicates with the next section. Section 30-1 extends vertically from an opening 32 in the lower portion of confinement cage 1 of sector 101 all the way to a region 30-*a* located in bottom part 10 of sector 101. Section 30-2 extends radially in bottom part 10 of sector 101 from region 30-*a* to a region 30-*b* located at the level of the external cage of sector 101. Section 30-6 extends vertically in the external cage of sector 101 from region 30-*b* to a region 30-*e*. Section 30-7 extends horizontally in the external cage from region 30-*e* in sector 101 to a region 30-*f* in sector 102. Section 30-8 extends vertically in the external cage of sector 102 from region 30-*f* to a region 30-*c* located in bottom part 10 of sector 102. Section 30-4 extends radially in bottom part 10 of sector 102 from region 30-*c* to a region 30-*d* located at the level of confinement cage 1 of sector 102. Section 30-5 extends vertically in confinement cage 1 of sector 102 from end 30-*d* to an opening 33 in the lower portion of confinement cage 1 of sector 102.

In FIGS. 2B and 3B, the cooling fluid is injected into ducts 30 through openings 32 and discharged through openings 33.

The duct sections are for example formed by drilling. They are closed by the inserting of plugs and/or by soldering at the drilling openings at the locations where duct 30 should not be open.

It should be understood that the duct structures and shapes illustrated in FIGS. 2B and 3B are possible embodiments only. Many other structures may be provided. In particular, several ducts per sector may be provided.

The confinement cage, the bottom and preferably the external cage, when provided, are made tight by filling the space between sectors with a thermal insulator.

The manufacturing of such plasma torches is simple since the confinement cage, the bottom part and, if present, the external cage, form one and the same element. Such an element may be formed by molding, machining, or by welding of different sub-elements. To manufacture this one-piece assembly, it may be started from a copper block which is milled to define the bottom part, the confinement cylinder, and possibly the external cylinder. Once this block has been formed, simple sawing operations will provide a division into sectors. Of course, this is likely to have various alterations. For example, the cylinder(s) and the bottom part may be manufactured separately and welded or assembled in another way and slotted to achieve a division into sectors while maintaining the coherence of the assembly.

An advantage of the torch structures described herein is their easy mounting. Indeed, the internal cage, the bottom part and possibly the external cage forms a one-piece assembly which is thus easy to mount.

Another advantage is the fact that there is a single cooling circuit.

Figure 1:
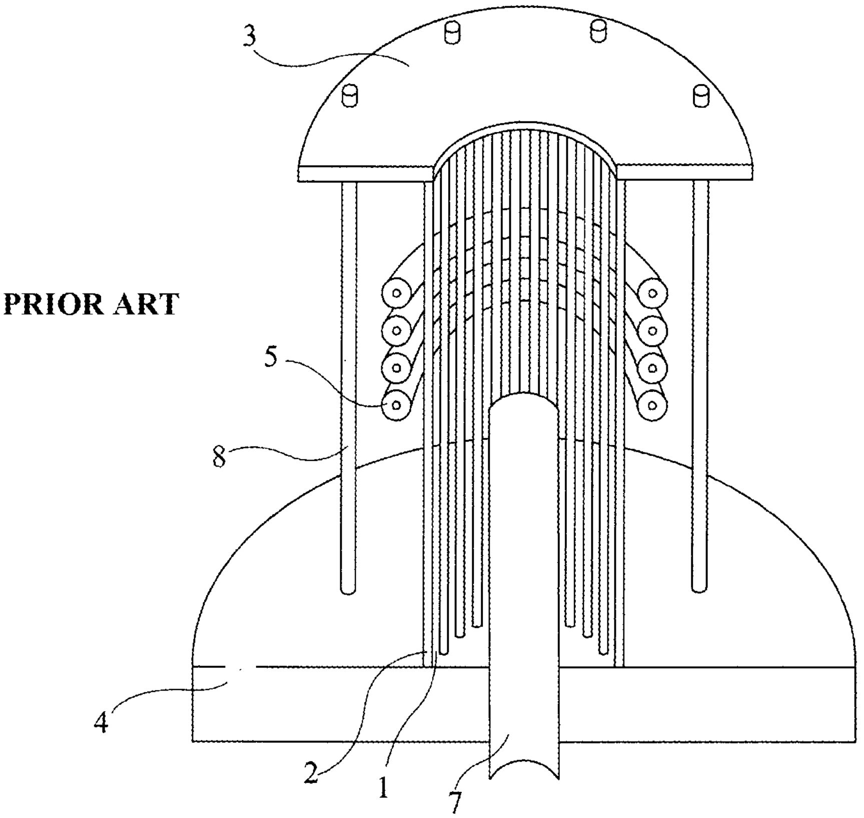
FIG. 1 is a perspective view cut along a vertical plane of an inductive plasma torch with a cold confinement cage of the type described in U.S. Pat. No. 5,877,471.

The plasma torch comprising a sectorized external cage is particularly compact. Indeed, the inductor is located in a cold area and protected from dust of the outer environment, the dimensions of the plasma torch may be decreased without fearing breakdowns due to the strong A.C. currents flowing through the inductor. Conversely, for a given torch volume, the torch structure comprising a sectorized external cage described herein may be associated with an A.C. current generator more powerful than in the case of prior structures. For example, for the above-mentioned dimensions, the generator power is limited to 200 kW for a torch structure equivalent to that described in FIG. 1, to be compared with 350 kW for the torch structure comprising a sectorized one-piece assembly.

In an embodiment, the confinement cage, the bottom part and, if provided, the external cage, are made of copper. The cap is made of a fluorinated polymer such as PTFE GF25, better known as Teflon. The outer diameter of the external cage is 210 mm, the inner diameter of the confinement cage is 50 mm, and the external diameter of the inductive winding is 110 mm. The height of the confinement cage and of the external cage is 290 mm. The thickness of the confinement cage is 10 mm. The injector penetrates into the confinement cage all the way to a distance of 70 mm away from the bottom part. The inductive winding starts 30 mm away from the bottom part and ends 110 mm away from the bottom part. The confinement cage, the bottom part and, according to the embodiment, the external cage, are divided into 12 regularly-distributed sectors. The sectorization, when it is continued to the lower edge of the confinement cage, is interrupted 20 mm away from the bottom of the external cage or from the bottom part according to the embodiment. The spacing between sectors is 1.5 mm. The diameter of the ducts in the confinement cage, the bottom part and, according to the embodiment, the external cage, is 3 mm.

Specific embodiments of the present invention have been described. Various alterations, modifications, and improvements will occur to those skilled in the art. In particular, the shape and the dimensions of the confinement cage, the shape and the dimensions of the external cage, the cooling circuit, the nature of the material forming the confinement cage, the external cage, or the bottom part, and the method for making the confinement cage, the bottom part, and the external cage tight, will be selected by those skilled in the art according to the desired performances of the plasma torch.

The number of sectors may be selected by those skilled in the art to optimize the features of the torch, and especially to promote the propagation of the magnetic field towards the inside of the structure and limit its propagation towards the outside of the structure when the plasma torch is provided with a sectorized external cage.

In an embodiment, the thickness of the external cage may be chosen to be greater than that of the confinement cage.

Different usual alternative embodiments of plasma torches have not been described herein. In particular, a ring made of a refractory material forming a thermal shield protecting the bottom part against the thermal radiation generated by the material heated by the plasma torch may be added to the bottom part on its outer side.

The invention claimed is:

1. An inductive plasma torch, comprising:

a cylindrical metal confinement cage, a metal element rigidly attached to the confinement cage, radially extending, outwards, from the periphery of an end thereof, and an inductor surrounding the confinement cage, wherein the confinement cage and said element are divided along axial planes into regularly distributed sectors, and wherein the sectors are alternately attached to a portion of the confinement cage on the side opposite to the element and to a portion of said element on the side opposite to the confinement cage.

2. The inductive plasma torch of claim 1, wherein said element is a laterally-extending bottom part.

3. The inductive plasma torch of claim 2, wherein said element comprises an external cylindrical cage, concentric to the confinement cage and attached thereto by the bottom part.

4. The inductive plasma torch of claim 1, wherein the confinement cage and said element are crossed by cooling fluid ducts.

5. The inductive plasma torch of claim 1, wherein the confinement cage and said element are made of copper.

6. A method for manufacturing the inductive plasma torch of claim 1, wherein a block of a metallic material, comprising a first cylinder and an element rigidly attached to the first cylinder by one end thereof radially extending outwards from the periphery of an end of the first cylinder, is formed, and wherein axial slots are formed to define sectors in said block, each slot crossing the element or the first cylinder and the cutting being alternately interrupted a short distance from an edge of the element opposite to the first cylinder and at a short distance from an edge of the first cylinder opposite to the element.

7. The inductive plasma torch forming method of claim 6, wherein said element is a laterally-extending bottom part.

8. The inductive plasma torch forming method of claim 6, wherein said element is a second cylinder concentric to and rigidly attached to the first cylinder by a bottom part.

9. The method of claim 6, wherein said block is formed by milling.

10. The method of claim 6, wherein the conductive material is copper.

11. The method of claim 6, wherein cooling fluid ducts are formed across the thickness of the cylinder and of said element.

12. The inductive plasma torch of claim 2, wherein the confinement cage and said element are crossed by cooling fluid ducts.

13. The inductive plasma torch of claim 3, wherein the confinement cage and said element are crossed by cooling fluid ducts.

14. The inductive plasma torch of claim 2, wherein the confinement cage and said element are made of copper.

15. The inductive plasma torch of claim 3, wherein the confinement cage and said element are made of copper.

16. The inductive plasma torch of claim 4, wherein the confinement cage and said element are made of copper.

17. The inductive plasma torch forming method of claim 7, wherein said element is a second cylinder concentric to and rigidly attached to the first cylinder by a bottom part.

18. The method of claim 7, wherein said block is formed by milling.

19. The method of claim 7, wherein the conductive material is copper.

20. The method of claim 7, wherein cooling fluid ducts are formed across the thickness of the cylinder and of said element.

* * * * *